United States Patent
Rosenfeld et al.

(10) Patent No.: US 12,229,583 B2
(45) Date of Patent: *Feb. 18, 2025

(54) SYSTEM IN THE MIDDLE TRANSACTION PROCESSOR

(71) Applicant: Jane Technologies, Inc., Santa Cruz, CA (US)

(72) Inventors: Socrates Munaf Rosenfeld, Santa Cruz, CA (US); Abraham Munaf Rosenfeld, Santa Cruz, CA (US); Howard Hong, Walnut Creek, CA (US); Simon James Roddy, Berkeley, CA (US); Benjamin Aaron Green, Lahaina, HI (US); Andrew Michael Livingston, Napa, CA (US); Harry Kainen, Washington, DC (US); Scott Bramble, San Francisco, CA (US)

(73) Assignee: Jane Technologies, Inc., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,380

(22) Filed: Jan. 5, 2024

(65) Prior Publication Data

US 2024/0256327 A1    Aug. 1, 2024

Related U.S. Application Data

(63) Continuation of application No. 18/127,750, filed on Mar. 29, 2023.
(Continued)

(51) Int. Cl.
*G06F 9/46* (2006.01)
*G06F 16/00* (2019.01)

(52) U.S. Cl.
CPC .............. *G06F 9/466* (2013.01); *G06F 16/00* (2019.01)

(58) Field of Classification Search
CPC ................................. G06F 9/466; G06F 16/00
See application file for complete search history.

(56) References Cited

U.S. PATENT DOCUMENTS 7,580,699 B1    8/2009   Shaw et al.
9,836,772 B1    12/2017  Rosenfeld et al.
(Continued)

OTHER PUBLICATIONS

Srinisava et al. Distributed Transaction Processing on an Ordering Network. [online] University of Virginia., pp. 1-20. Retrieved From the Internet <https://citeseerx.ist.psu.edu/document?repid=repl&type=pdf&doi=17e96df7f29c7877b4cfd6ef802b55541076c355> (Year: 2001).

*Primary Examiner* — April Y Blair
*Assistant Examiner* — Jonathan R Labud
(74) *Attorney, Agent, or Firm* — Fish & Richardson P.C.

(57) ABSTRACT

Methods, systems, and apparatus, including computer programs encoded on computer storage media, for transaction management. One of the methods includes, for a first transaction from a plurality of transactions, in response to determining that the first transaction for a corresponding user account at a first entity satisfies the threshold criteria for a corresponding second entity, accessing account data for the corresponding user account, first data for the first entity, and second data for the second entity to complete the first transaction. For a second transaction, in response to determining that the second transaction for a corresponding user account at the first entity does not satisfy the threshold criteria for the corresponding second entity, a determination is made to not access second data for the corresponding second entity, and account data is accessed for the corresponding user account and the first data for the first entity to complete the second transaction.

20 Claims, 3 Drawing Sheets

Related U.S. Application Data

(60) Provisional application No. 63/441,583, filed on Jan. 27, 2023.

(56) References Cited

U.S. PATENT DOCUMENTS

| | | |
|---|---|---|
| 10,181,142 B2 | 1/2019 | Rosenfeld et al. |
| 10,664,801 B1 | 5/2020 | Rosenfeld et al. |
| 11,010,802 B2 | 5/2021 | Rosenfeld et al. |
| 11,010,811 B2 | 5/2021 | Rosenfeld et al. |
| 11,288,631 B2 | 3/2022 | Rosenfeld et al. |
| 11,361,280 B2 | 6/2022 | Rosenfeld et al. |
| 11,481,828 B2 | 10/2022 | Rosenfeld et al. |
| 2002/0069139 A1* | 6/2002 | Bernstein .............. G06Q 20/02 705/14.4 |
| 2016/0210633 A1 | 7/2016 | Epelman et al. |
| 2021/0119793 A1 | 4/2021 | Gaddam et al. |
| 2021/0326951 A1 | 10/2021 | Rosenfeld et al. |
| 2022/0270142 A1 | 8/2022 | Rosenfeld et al. |
| 2022/0277357 A1 | 9/2022 | Rosenfeld et al. |
| 2022/0292080 A1* | 9/2022 | Rao .................... G06F 16/9024 |

\* cited by examiner

SYSTEM IN THE MIDDLE TRANSACTION PROCESSOR

CLAIM OF PRIORITY

This application is a continuation of U.S. application Ser. No. 18/127,750, filed on Mar. 29, 2023, which claims priority to U.S. Patent Application Ser. No. 63/441,583, filed on Jan. 27, 2023, the entire contents of which are hereby incorporated by reference.

BACKGROUND

Various entities maintain databases of data. Sometimes when entities work together, they can share data. However, differences in systems and communication features can make communication between disparate systems difficult. For instance, if one entity's system does not have an application programming interface, that entity might not be able to automate data communication with another entity.

SUMMARY

In general, one aspect of the subject matter described in this specification can be embodied in methods that include the actions of, for each of a plurality of transactions, receiving, for a user account, data for the transaction at a corresponding first entity, determining whether the transaction for the user account at the first entity satisfies a threshold criteria for a corresponding second entity, for a first transaction from the plurality of transactions and in response to determining that the first transaction for the corresponding user account at the first entity satisfies the threshold criteria for the corresponding second entity, accessing account data for the corresponding user account, first data for the first entity, and second data for the corresponding second entity to complete the first transaction, and for a second transaction from the plurality of transactions and in response to determining that the second transaction for the corresponding user account at the first entity does not satisfy the threshold criteria for the corresponding second entity, determining to not access second data for the corresponding second entity, and accessing account data for the corresponding user account, and the first data for the first entity to complete the second transaction.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination.

In some implementations, the first transaction and the second transaction are for the same user account.

In some implementations, the method can include, for the first transaction from the plurality of transactions and in response to determining that the first transaction for the corresponding user account at the first entity satisfies the threshold criteria for the corresponding second entity, providing data about the corresponding user account and the first transaction to the corresponding second entity, and for the second transaction from the plurality of transactions, and in response to determining that the second transaction for the corresponding user account at the first entity does not satisfy the threshold criteria for the corresponding second entity, determining to not provide data about the corresponding user account to the corresponding second entity.

In some implementations, determining whether the transaction for the user account at the first entity satisfies the threshold criteria for the second entity includes determining whether the transaction for the user account at the first entity satisfies the threshold criteria that requires a transaction for a product provided by the second entity occur within a predetermined geographic area.

In some implementations, determining whether the transaction for the user account at the first entity satisfies the threshold criteria for the second entity includes determining whether the transaction for the user account at the first entity satisfies the threshold criteria that requires a notification that a) is provided to the user account, and b) indicates at least some of the threshold criteria be provided to the user account.

In some implementations, the method can include completing the first transaction using the account data for the corresponding user account, the first data for the first entity, and the second data for the corresponding second entity, the completing including retrieving third data using the account data, retrieving fourth data using the second data for the corresponding second entity, and providing, to a system for the first entity and using the first data, the third data and the fourth data.

In some implementations, the method can include completing the first transaction using the account data for the corresponding user account, the first data for the first entity, and the second data for the corresponding second entity, the completing including: retrieving third data using the account data; providing, to a system for the first entity and using the first data, the third data; retrieving fourth data using the second data for the corresponding second entity; and providing, to a system for the first entity and using the first data, the fourth data.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

The subject matter described in this specification can be implemented in various implementations and may result in one or more of the following advantages. In some implementations, the systems and methods described in this specification can reduce the number of resources required to complete a transaction. In some implementations, the systems and methods described in this specification can enable automated communication between multiple entities as part of a transaction compared to other systems. This automated communication can include real-time communication between systems for the entities, e.g., when prior systems did not allow automated, real-time, or both, communication. In some implementations, the systems and methods described in this specification can optimize the flow of data, currency, customer information, or a combination of these, between the wholesalers/brands of cannabis products and the multiple store fronts. In some implementations, the systems and methods described in this specification enable a system in the middle to facilitate transactions between separate entities, e.g., multiple stores and a brand, which communication would otherwise require more computational resources, e.g., as the brand communicates with each of the multiple stores separately.

In some implementations, the systems and methods described in this specification can enable an entity to reduce transaction computational costs by detecting when the entity should participate in a transaction rather than requiring another entity in the transaction to log the transaction and separately communicate with the entity using the log. Other advantages are discussed below.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A transaction management system can manage, in real-time, various transactions between users and different types of entities. The transaction management system is designed to reduce or eliminate the need for a system of a first type of entity to interact directly and separately with systems of multiple different second types of entities. Rather, communication, computing, or both, resources can be reduced by having the second type of entity communicate certain transaction threshold criteria just to the transaction management system and not to the first type of entities.

Transactions at the first type of entities can be processed in accordance with the threshold criteria of the second type of entities without the first type of entities needing to receive the threshold criteria, configure systems with the threshold criteria, or even be aware of the threshold criteria in some examples. Transactions at a first type of entity that satisfy the threshold criteria of a second type of entity can be automatically completed by the transaction management system using data of both entities, while transactions at a first type of entity that don't satisfy the threshold criteria of the second type of entity can be automatically completed using data for the first type of entity without accessing or using data for the second type of entity.

Figure 1:
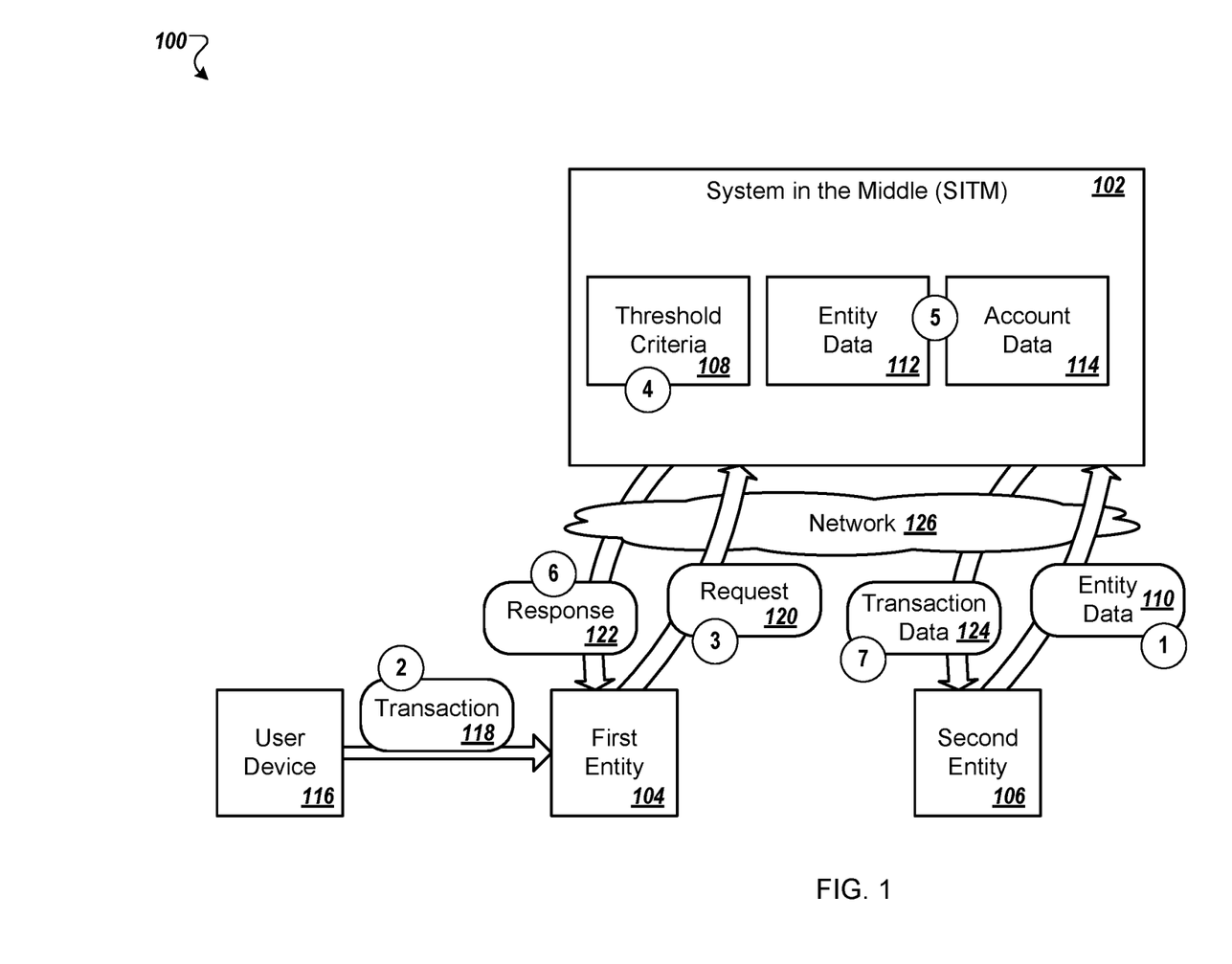
FIG. 1 depicts an example system in which a system-in-the-middle manages transactions involving different entities.

FIG. 1 depicts an example system 100 in which a system-in-the-middle ("SITM") 102 manages transactions involving different entities. The SITM is an example of a transaction management system. The SITM 102 manages transactions that may involve first entities such as a first entity 104 and second entities such as a second entity 106. Although one first entity 104 and one second entity 106 are illustrated, the system 100 can include many first entities and second entities.

The SITM 102 can be configured with threshold criteria 108 for second entities. For a transaction at the first entity 104, if threshold criteria for the second entity 106 is satisfied, the SITM 102 can complete the transaction using data for the first entity 104 and data for the second entity 106. If the threshold criteria for the second entity 106 is not satisfied, the SITM 102 can complete the transaction without using data for the second entity 106. Further details of the SITM 102 are discussed below.

For example, in a first stage (e.g., depicted as a circled "one"), the second entity 106 provides entity data 110 for the second entity 106 to the SITM 102. The SITM 102 can store received entity data 110 for the second entity 106 in entity data 112. The entity data 110-112 can be encrypted in storage at the SITM 102. The SITM 102 can use the entity data for the second entity 106 to complete transactions that satisfy threshold criteria for the second entity 106, as described below. The second entity 106 can provide the threshold criteria for the second entity 106 to the SITM 102, which can be stored by the SITM 102 in the threshold criteria 108. The threshold criteria can be part of the entity data 110 or other data received by the SITM 102.

The SITM 102 can include account data 114 for user accounts of users who participate in the system 100. For example, the account data 114 can include user account data for a user of a user device 116.

In a second stage, the user device 116 can initiate a transaction 118 at the first entity 104. For example, the user device 116 can initiate the transaction 118 by sending a transaction request using an application or web site running on the user device 116, where the application or web site may be provided by the SITM 102 or the first entity 104. As another example, the transaction 118 may be initiated in response to a system at the first entity 104 scanning a code that is displayed on the user device 116. Although shown as being initiated by the user device 116, in some examples, the transaction 118 may be initiated at the first entity 104 in response to the user of the user device 116 providing information (e.g., including user account information) to a system of the first entity 104 while at the first entity 104 during the transaction 118. For some transactions, the user account is in a logged-in state with respect to the SITM 102 and/or the first entity 104 during the transaction, such as when the transaction is initiated using an application or web site provided by the SITM 102 or the first entity 104, or when the user of the user device 116 provides login credentials at a system of the first entity 104.

In a third stage, the first entity 104 sends a request 120 to the SITM 102 to complete the transaction 118. A system at the first entity 104 can send the request 120 to the SITM 102, for example. The request 120 can include data for the transaction 118 and data indicating a user account for the user device 116.

In a fourth stage, the SITM 102 determines whether the transaction 118 for the user account at the first entity 104 satisfies a threshold criteria for the second entity 106. The SITM 102 can determine that the transaction 118 is for an item (e.g., product or service) provided by the second entity 106, for example. The SITM 102 can identify, in the threshold criteria 108, the threshold criteria for the second entity 106. The threshold criteria for the second entity 106 can be item-specific or can apply generally to the second entity 106. The threshold criteria for the second entity 106 can involve location, item-count, user account history, or other types of parameters, as described in more detail below. The SITM 102 can determine whether the transaction 118 for the user account at the first entity 104 satisfies the threshold criteria for the second entity 106 to determine whether entity data for the second entity 106 is required for completing the transaction 118, as described in more detail below.

In a fifth stage, the SITM 102 accesses account data for the user account from the account data 114 and entity data from the entity data 112 to complete the transaction 118. Different types of entity data can be accessed based on whether the transaction 118 for the user account at the first entity 104 satisfies the threshold criteria for the second entity 106. For example, the SITM 102 can, to complete the transaction 118, in response to determining that the transaction 118 for the user account at the first entity 104 satisfies the threshold criteria for the second entity 106, access account data for the user account from the account data 114, first data for the first entity 104 from the entity data 112, and second data for the second entity 106 from the entity data 112.

As described in more detail below, the SITM 102 can complete the transaction 118 using the accessed account data, the first data for the first entity 104, and the second data for the second entity 106, e.g., from the entity data 110. Use of the SITM 102 to complete the transaction 118 can save resources as compared to transaction scenarios without the SITM 102, since the transaction 118 can be completed by the SITM 102 without the first entity 104 needing to communicate with the second entity 106 before, during, or after processing of the transaction 118. This can reduce resource usage when the second entity 106 would otherwise have to provide the threshold criteria 108 to multiple, e.g., tens or hundreds, first entities 104 without the SITM 102.

In some example scenarios for the transaction 118, if the transaction 118 for the user account at the first entity 104 does not satisfy the threshold criteria for the second entity 106, the SITM 102 can access account data for the user account from the account data 114 and first data for the first entity 104 from the entity data 112 for completion of the transaction 118 without accessing any second data for the second entity 106 from the entity data 112. The SITM 102 can determine, for example, based on the transaction 118 for the user account at the first entity 104 not satisfying the threshold criteria for the second entity 106, that second data for the second entity 106, e.g., from the entity data 110, is not required to complete the transaction 118. Therefore, the SITM 102 can determine to not access second data for the second entity 106 from the entity data 112 in response to the request 120.

In a sixth stage, the SITM 102 sends a response 122 to the first entity 104 responsive to the request 120. The response 122 can include a completion status (e.g., successful, unsuccessful) for the completion of the transaction 118. As another example, the response 122 can include other information related to finalizing the transaction 118.

In a seventh stage, the SITM 102 can determine whether to send transaction data 124 for the transaction 118 to the second entity 106. In examples where the transaction 118 for the user account at the first entity 104 satisfies the threshold criteria for the second entity 106, the SITM 102 can send transaction data 124 for the transaction 118 to the second entity 106. The transaction data 124 can include data about the user account for the user device 116 that initiated the transaction 118. For examples where the transaction 118 for the user account at the first entity 104 does not satisfy the threshold criteria for the second entity 106, the SITM 102 can determine to not send information about the transaction 118 or the user account, or both, to the second entity 106.

For examples where the transaction 118 for the user account at the first entity 104 satisfies the threshold criteria for the second entity 106, the second entity 106 can receive the data for the transaction 118 and the user account in real time as part of completion of the transaction 118. Accordingly, the second entity 106 can react and respond more quickly and efficiently to the data about the transaction 118, as compared to other examples where aggregate data about transactions might be received by the second entity 106 at a later point in time from the SITM 102, the first entity 104, or from another system or combination of systems, e.g., from multiple first entities 104.

The second entity 106 can react to received transaction and user account information in different ways. For instance, the second entity 106 can determine to modify threshold criteria for the second entity 106 and can send updated threshold criteria to the SITM 102. The updated threshold criteria can be evaluated by the SITM 102 during completion of subsequent transactions. As another example, the second entity 106 can determine to communicate with the user device 116, the account for the user device 116, or both, based on the transaction information for the transaction 118 and on receiving the user account information, for examples in which the user of the user account has given consent for such communication.

The SITM 102 can, as described above, handle transactions at first entities differently based on whether transactions satisfy threshold criteria of corresponding second entities. Advantageously, the second entity 106 only needs to share threshold criteria for the second entity 106 with the SITM 102. The second entity 106 does not need to share threshold criteria with the first entity 104 or with other first entities. Accordingly, resource savings can be realized, as compared to alternative approaches in which each first entity would need to expend communication resources receiving threshold criteria from each second entity and processing resources that would be consumed by each first entity being configured with different threshold criteria from different second entities.

Use of the SITM 102 can provide transaction processing consistency, e.g., increased accuracy. For instance, a same or different user account can have a same threshold criteria analysis performed for transactions of items of a second entity, regardless of first entity for or at which the transaction is initiated. Such transaction consistency might not occur if each first entity had to separately receive and separately configure a first entity system with the threshold criteria, for example. Some first entities may not successfully receive or correctly configure the second entity threshold criteria. Configuring the SITM 102 with the second entity threshold criteria can avoid such risks and inconsistencies. Other details and advantages of use of the SITM 102 are discussed below.

The SITM 102, the first entity 104, the second entity 106, or a combination of these, are examples of a system implemented as computer programs on one or more computers in one or more locations, in which the systems, components, and techniques described in this specification are implemented. The user device 116 can include personal computers, mobile communication devices, and other devices that can send and receive data over a network 126. The network 126, such as a local area network ("LAN"), wide area network ("WAN"), the Internet, or a combination thereof, connects the user device 116, the SITM 102, the first entity 104, and the second entity 106. The SITM 102 can use a single server computer or multiple server computers operating in conjunction with one another, including, for example, a set of remote computers deployed as a cloud computing service.

The SITM 102, the first entity 104, the second entity 106, or a combination of these, can include one or more data processing apparatuses, can be implemented in code, or a combination of both. For instance, the SITM 102 can include one or more data processors and instructions that cause the one or more data processors to perform the operations discussed herein.

Figure 2:
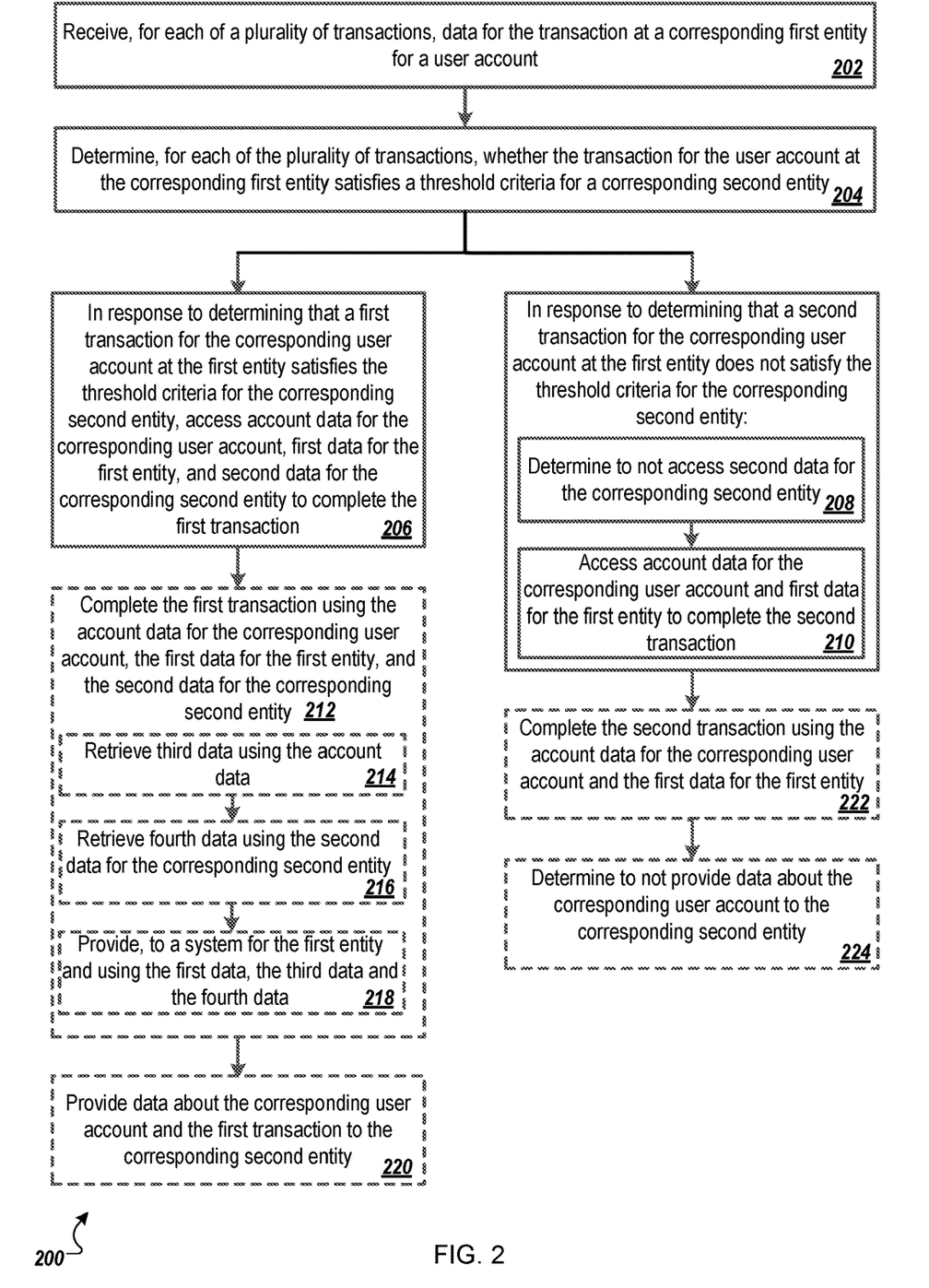
FIG. 2 is a flow diagram of an example process for transaction processing.

FIG. 2 is a flow diagram of an example process 200 for transaction processing. For example, the process 200 can be used by the SITM 102 from the system 100 as an example of a transaction management system.

A transaction management system receives, for each of a plurality of transactions, data for the transaction at a corresponding first entity for a user account (202). The transaction management system can receive data for the transaction from a system of the first entity and/or from a user device.

The transaction management system determines, for each of the plurality of transactions, whether the transaction for the user account at the corresponding first entity satisfies a threshold criteria for a corresponding second entity (204). The corresponding second entity can provide an item, e.g., product or service, of the transaction. The first entity can provide the product or service to the user of the user device, e.g., after receiving the product from the second entity.

For a first transaction from the plurality of transactions and in response to determining that the first transaction for the corresponding user account at the first entity satisfies the threshold criteria for the corresponding second entity, the transaction management system accesses account data for the corresponding user account, first data for the first entity, and second data for the corresponding second entity to complete the first transaction (206). The transaction management system can determine, based on the first transaction for the corresponding user account at the first entity satisfying the threshold criteria for the corresponding second entity, that the second data is required for completing the first transaction. Accordingly, the transaction management system can access the second data for the corresponding second entity as well as the account data for the corresponding user account and the first data for the first entity.

The threshold criteria can be any appropriate type of criteria for the transaction. The threshold criteria can require, for example, that a transaction for a product provided by the second entity occur within a predetermined geographic area. In some examples, the threshold criteria can require a notification that a) is provided to the user account, and b) indicates at least some of the threshold criteria be provided to the user account. Other examples of threshold criteria can include a number of items in the transaction being at least a threshold number of items, a number of previous transactions for the user account being at least a threshold number of transactions (e.g., in a particular time period), a transaction date matching a predetermined transaction date criteria, or the transaction being for an item of a certain type. Other types of threshold criteria can be used, including combinations of the threshold criteria mentioned here.

For a second transaction from the plurality of transactions and in response to determining that the second transaction for the corresponding user account at the first entity does not satisfy the threshold criteria for the corresponding second entity, the transaction management system determines to not access second data for the corresponding second entity (208). Also in response to determining that the second transaction for the corresponding user account at the first entity does not satisfy the threshold criteria for the corresponding second entity, the transaction management system accesses account data for the corresponding user account and the first data for the first entity to complete the second transaction (210). For example, the transaction management system can determine that the user account data and the first data are required for completing the transaction and that data from the second entity is not required for completing the transaction.

The first transaction and the second transaction can be for the same user account or for different user accounts. As such, the transaction management system can process different transactions differently, either for a same user or across users, based on whether a given transaction at a first entity satisfies threshold criteria for a second entity.

In some examples, the first transaction and the second transaction can be part of a single transaction for multiple products or services. For instance, the transaction management system can determine that a single transaction is for five products. The management system can determine that three of the products satisfy the threshold criteria, e.g., alone or in combination, and that the other two of the products do not satisfy the threshold criteria. The management system can then complete the portion of single transaction for the three products using second data for the second entity, user account data, and first data. The management system can use only user account data and first data to complete the portion of the single transaction for the two products.

In some implementations, the transaction management system optionally completes the first transaction using the account data for the corresponding user account, the first data for the first entity, and the second data for the corresponding second entity (212).

To complete the first transaction, the transaction management system can retrieve third data using the account data (214). To complete the first transaction, the transaction management system can also retrieve fourth data using the second data for the corresponding second entity (216). To complete the first transaction, the transaction management system can also provide, to a system for the first entity and using the first data, the third data and the fourth data (218).

In some implementations, for the first transaction from the plurality of transactions and in response to determining that the first transaction for the corresponding user account at the first entity satisfies the threshold criteria for the corresponding second entity, the transaction management system can provide data about the corresponding user account and the first transaction to the corresponding second entity (220). The transaction satisfying the threshold criteria of the second entity can correspond to the user of the user account providing user consent information for the providing of the user account information to the second entity. For instance, the user account might not satisfy at least some of the threshold criteria for the transaction without providing the user consent.

In some implementations, the transaction management system can complete the second transaction using the account data for the corresponding user account and the first data for the first entity (222). This can occur when the threshold criteria are not satisfied.

In some implementations, the transaction management system can, for the second transaction from the plurality of transactions and in response to determining that the second transaction for the corresponding user account at the first entity does not satisfy the threshold criteria for the corresponding second entity, determine to not provide data about the corresponding user account to the corresponding second entity (224). Determining to not provide data about the user account to the corresponding entity can correspond with maintaining user account privacy, e.g., for transactions that do not satisfy the threshold criteria for the second entity.

The order of steps in the process 200 described above is illustrative only, and the transaction processing can be performed in different orders. For example, the transaction management system can retrieve the fourth data and then retrieve the third data.

In some implementations, the process 200 can include additional steps, fewer steps, or some of the steps can be divided into multiple steps. For example, the process can include only steps 202 through 206, or only steps 202, 204, 208, and 210.

In some implementations, the transaction management system completes the first transaction using the account data for the corresponding user account, the first data for the first entity, and the second data for the corresponding second entity. For example, the transaction management system can: retrieve third data using the account data; provide, to a system for the first entity and using the first data, the third data; retrieve fourth data using the second data for the corresponding second entity; and provide, to a system for the first entity and using the first data, the fourth data.

In some implementations, the first entity is a retailer and the second entity is a provider of a product or service (e.g., a brand or manufacturer). Products can include commercial products such as merchandise sold in retail stores, such as soda pop, cannabis, etc. As another example, a product provided by the second entity can be a software product. Threshold criteria can define criteria for a transaction discount. Threshold criteria can include a requirement that the transaction occurs in a jurisdiction where transaction discounts are allowed for a given item. Threshold criteria can require that the transaction is for a particular product or service, is for at least a certain number of product or service items, or satisfies certain user transaction history for the user account for items provided by the second entity.

The transaction management system can manage, in real-time, the various transactions between customers of products, store fronts that sell the products, and brands of the products. The transaction management system is designed to reduce or eliminate the need for a system of a particular brand of a product to interact directly and separately with systems of multiple different store fronts that the brand supplies products to, to participate in automated transactions with a store front's system, e.g., apply promotions to the consumers at the store front, or a combination of both. For example, a manufacturer can provide (as threshold criteria) transaction discount information just to the transaction management system, without needing to expend computing resources by providing that information separately to each retail store. Correspondingly, respective retail stores do not need to expend resources receiving threshold criteria or configuring retail systems using manufacturer threshold criteria. In some examples, the retail stores' systems need not have data for or otherwise be aware of the threshold criteria, e.g., the retail stores' systems can process at least a part of various transactions without knowledge of the threshold criteria.

In examples where completing the first transaction includes retrieving third data using the account data, retrieving fourth data using the second data for the corresponding second entity, and providing, to a system for the first entity and using the first data, the third data and the fourth data, the account data can be user payment account information for the user account, the system for the first entity can be a financial system for first entity, the first data can be financial account information at the financial system for the first entity, and the third data can be data for receiving a first payment at the financial system for the first entity from the user payment account. The second data can be second-entity payment account information for the second entity and the fourth data can be data for receiving a second payment at the financial system for the first entity from the second-entity payment account. The first entity receiving both the first payment and the second payment as part of completing the transaction can avoid a transaction-completion and payment delay and can reduce resource expenditures by removing a need for separate follow-on transaction(s) for the first entity to receive reimbursements from the second entity.

In some cases, rather than both a first payment and a second payment being received by the system for the first entity, a first non-discounted payment can be provided from the user payment account to the first entity and a reimbursement payment can be provided to a system for the user account from the second-entity payment account.

In examples where the second transaction is completed using the account data for the corresponding user account and the first data for the first entity, the account data can be user payment account information for the user account and the first data for the first entity can be financial account information for the first entity. Completion of the second transaction can include receiving a payment from the user payment account at a financial system for the first entity.

In examples where the second entity receives data about the corresponding user account and the first transaction, the second entity can determine to provide user-account-specific messages to a user device of the user account, such as for user-account-specific future transaction discounts. Some examples can include the second entity determining to send, based on analysis of received transaction data, demographic-specific messages (e.g., about future transaction discounts) to certain user accounts that match certain demographic profiles.

When the threshold criteria define criteria for a transaction discount, the transaction management system receiving the user account information for the first transaction information that satisfies the threshold criteria can correspond to the user consenting or opting in, as part of receiving the transaction discount, to the providing of user account information to the second entity as part of completing the first transaction. For user accounts that have opted in, a brand or manufacturer can receive real-time data regarding transactions for those user accounts that meet the threshold criteria. The brand can establish a direct communication with those user accounts, for subsequent communications or promotions, for example. For user accounts that have not opted in, user privacy can be maintained.

For situations in which the systems discussed here collect personal information about users or user accounts, or may make use of personal information, the users may be provided with an opportunity to control whether programs or features collect personal information (e.g., information about a user's social network, social actions or activities, profession, a user's preferences, or a user's current location), or to control whether and/or how to receive content from the SITM 102 and/or the second entity 106 that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used.

A number of implementations have been described. Nevertheless, it will be understood that various modifications may be made without departing from the spirit and scope of the disclosure. For example, various forms of the flows shown above may be used, with steps re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 3:
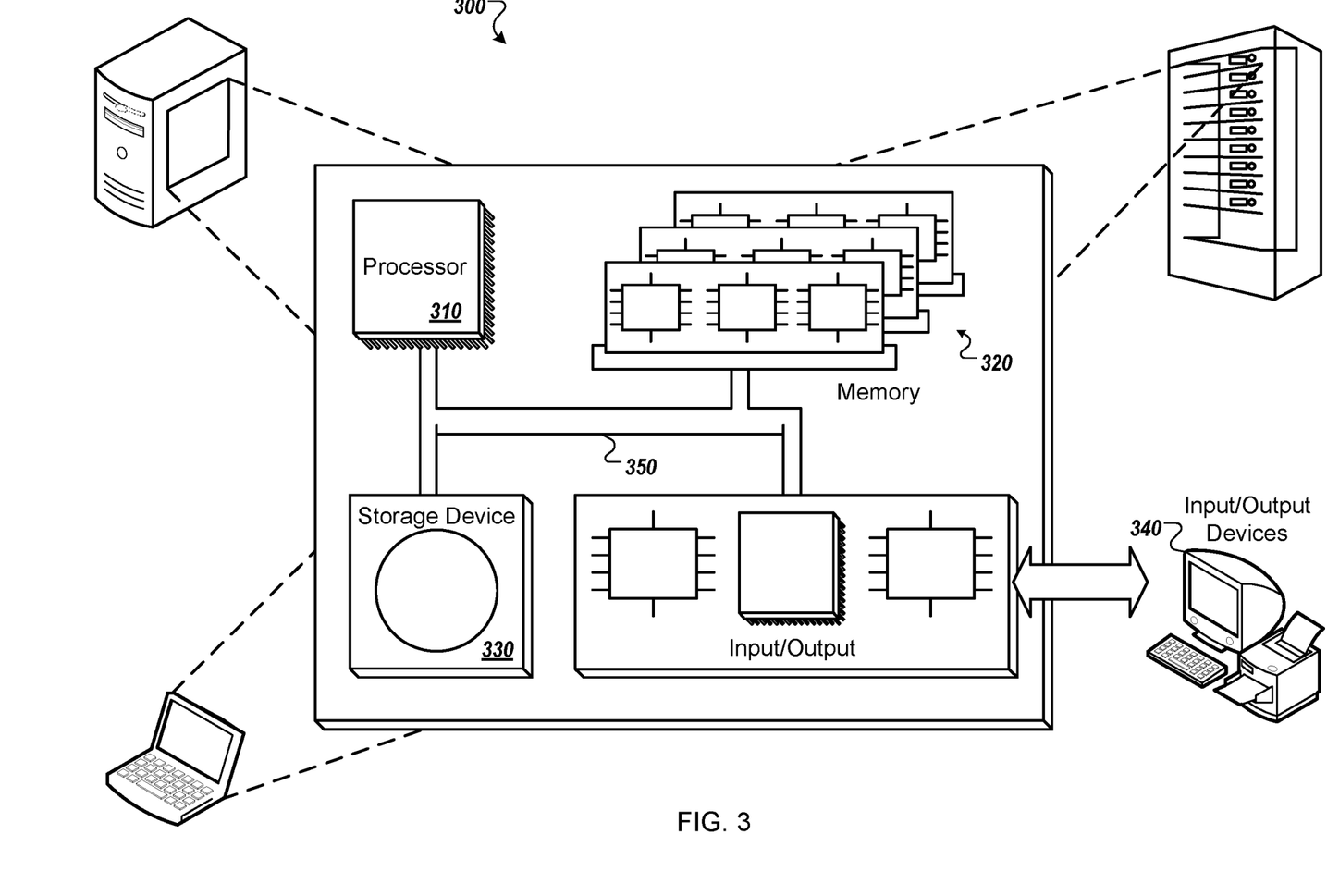
FIG. 3 is a block diagram of a computing system that can be used in connection with computer-implemented methods described in this specification.

An example of one such type of computer is shown in FIG. 3, which shows a schematic diagram of a computer system 300. The system 300 can be used for the operations described in association with any of the computer-implemented methods described previously, according to one implementation. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular implementations of the invention have been described. Other implementations are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A computer-implemented method comprising:
by a transaction management system that comprises one or more computers:
maintaining, in memory, one or more threshold criteria that i) are for a subset of products or services for which a first entity provides transactions, ii) were received from a second system for a second entity that provides the products or services, and iii) if satisfied would cause the transaction management system to access second data for the second entity that is stored in a database in the transaction management system to complete a transaction;
determining data for a transaction a) for a user account, b) at the first entity that performs transactions for a plurality of products, services, or a combination of both, from a plurality of second entities and c) for a product or service provided by the second entity from the plurality of second entities;
determining whether the transaction for the user account at the first entity satisfies the one or more threshold criteria that i) are for the subset of products or services for which the first entity provides transactions, ii) were received from the second system for the second entity that provides the products or services, and iii) if satisfied would cause the transaction management system to access second data for the second entity that is stored in a database in the transaction management system to complete a transaction;
in response to determining that the transaction for the user account at the first entity does not satisfy the one or more threshold criteria for the second entity:
determining to skip accessing second data for the second entity to complete the transaction; and
accessing first data for the first entity stored in a first database in the transaction management system to complete the transaction; and accessing account data for the user account stored in an account database in the transaction management system to complete the transaction;

retrieving, from a first external system and using a network and the account data, user transaction data; and completing the transaction by providing, to another system for the first entity and using the first data, the user transaction data and the product or service provider data.

2. The method of claim 1, comprising, in response to determining that the transaction for the user account at the first entity does not satisfy the one or more threshold criteria for the second entity, determining to skip retrieving, from a second external system and using the network and the second data for the second entity that provides the product or service, product or service provider data to complete the transaction.

3. The method of claim 1, wherein determining the data for the transaction comprises receiving, from a first system for the first entity and using the network, the data for the transaction a) for the user account, b) at the first entity that performs transactions for the plurality of products, services, or a combination of both, from the plurality of second entities and c) for the product or service provided by the second entity from the plurality of second entities.

4. The method of claim 3, wherein determining the data for the transaction comprises receiving, from a device for the user account and using the network, the data for the transaction a) for the user account, b) at the first entity that performs transactions for the plurality of products, services, or a combination of both, from the plurality of second entities and c) for the product or service provided by the second entity from the plurality of second entities.

5. The method of claim 1, wherein:
the one or more threshold criteria requires: i) that one or more product or service criteria are satisfied and ii) presentation, by a device for the user account, of a notification that indicates at least some of the one or more product or service criteria; and
determining whether the transaction for the user account at the first entity satisfies the one or more threshold criteria comprises determining, for the user account, whether a notification that indicates at least some of the one or more product or service criteria was presented by a device for the user account.

6. The method of claim 5, wherein:
determining whether the transaction for the user account at the first entity satisfies the one or more threshold criteria comprises determining that the notification that indicates at least some of the one or more product or service criteria was not presented by a device for the user account; and
determining to skip accessing second data for the second entity to complete the transaction is responsive to determining that the notification that indicates at least some of the one or more product or service criteria was not presented by a device for the user account.

7. The method of claim 6, comprising:
receiving updated threshold criteria for the one or more threshold criteria that if satisfied would cause the transaction management system to access second data for the second entity that is stored in a database in the transaction management system to complete a transaction; and determining, using the account data for the user account and the updated threshold criteria, to provide data for the notification to a device for the user account.

8. The method of claim 7, comprising:
providing, to the second system for the second entity and in real-time, other data for one or more other user accounts for which transactions at corresponding entities satisfy the one or more threshold criteria, wherein:
receiving the updated threshold criteria is responsive to providing the other data for one or more other user accounts for which transactions at corresponding entities satisfy the one or more threshold criteria.

9. A transaction management system comprising one or more computers and one or more storage devices on which are stored instructions that are operable, when executed by the one or more computers, to cause the one or more computers to perform operations comprising:
maintaining, in memory, one or more threshold criteria that i) are for a subset of products or services for which a first entity provides transactions, ii) were received from a second system for a second entity that provides the products or services, and iii) if satisfied would cause the transaction management system to access second data for the second entity that is stored in a database in the transaction management system to complete a transaction;
determining data for a transaction a) for a user account, b) at the first entity that performs transactions for a plurality of products, services, or a combination of both, from a plurality of second entities and c) for a product or service provided by the second entity from the plurality of second entities;
determining whether the transaction for the user account at the first entity satisfies the one or more threshold criteria that i) are for the subset of products or services for which the first entity provides transactions, ii) were received from the second system for the second entity that provides the products or services, and iii) if satisfied would cause the transaction management system to access second data for the second entity that is stored in a database in the transaction management system to complete a transaction;
in response to determining that the transaction for the user account at the first entity does not satisfy the one or more threshold criteria for the second entity:
determining to skip accessing second data for the second entity to complete the transaction; and
accessing first data for the first entity stored in a first database in the transaction management system to complete the transaction; and
accessing account data for the user account stored in an account database in the transaction management system to complete the transaction;
retrieving, from a first external system and using a network and the account data, user transaction data; and
completing the transaction by providing, to another system for the first entity and using the first data, the user transaction data and the product or service provider data.

10. The system of claim 9, the operations comprising, in response to determining that the transaction for the user account at the first entity does not satisfy the one or more threshold criteria for the second entity, determining to skip retrieving, from a second external system and using the network and the second data for the second entity that provides the product or service, product or service provider data to complete the transaction.

11. The system of claim 9, wherein determining the data for the transaction comprises receiving, from a first system for the first entity and using the network, the data for the transaction a) for the user account, b) at the first entity that performs transactions for the plurality of products, services, or a combination of both, from the plurality of second entities and c) for the product or service provided by the second entity from the plurality of second entities.

12. The system of claim 11, wherein determining the data for the transaction comprises receiving, from a device for the user account and using the network, the data for the transaction a) for the user account, b) at the first entity that performs transactions for the plurality of products, services, or a combination of both, from the plurality of second entities and c) for the product or service provided by the second entity from the plurality of second entities.

13. The system of claim 9, wherein:
the one or more threshold criteria requires: i) that one or more product or service criteria are satisfied and ii) presentation, by a device for the user account, of a notification that indicates at least some of the one or more product or service criteria; and
determining whether the transaction for the user account at the first entity satisfies the one or more threshold criteria comprises determining, for the user account, whether a notification that indicates at least some of the one or more product or service criteria was presented by a device for the user account.

14. The system of claim 13, wherein:
determining whether the transaction for the user account at the first entity satisfies the one or more threshold criteria comprises determining that the notification that indicates at least some of the one or more product or service criteria was not presented by a device for the user account; and
determining to skip accessing second data for the second entity to complete the transaction is responsive to determining that the notification that indicates at least some of the one or more product or service criteria was not presented by a device for the user account.

15. The system of claim 14, the operations comprising:
receiving updated threshold criteria for the one or more threshold criteria that if satisfied would cause the transaction management system to access second data for the second entity that is stored in a database in the transaction management system to complete a transaction; and
determining, using the account data for the user account and the updated threshold criteria, to provide data for the notification to a device for the user account.

16. The system of claim 15, the operations comprising:
providing, to the second system for the second entity and in real-time, other data for one or more other user accounts for which transactions at corresponding entities satisfy the one or more threshold criteria, wherein:
receiving the updated threshold criteria is responsive to providing the other data for one or more other user accounts for which transactions at corresponding entities satisfy the one or more threshold criteria.

17. One or more non-transitory computer storage media encoded with instructions that, when executed by one or more computers, cause the one or more computers to perform operations comprising:
by a transaction management system that comprises one or more computers:
maintaining, in memory, one or more threshold criteria that i) are for a subset of products or services for which a first entity provides transactions, ii) were received from a second system for a second entity that provides the products or services, and iii) if satisfied would cause the transaction management system to access second data for the second entity that is stored in a database in the transaction management system to complete a transaction;
determining data for a transaction a) for a user account, b) at the first entity that performs transactions for a plurality of products, services, or a combination of both, from a plurality of second entities and c) for a product or service provided by the second entity from the plurality of second entities;
determining whether the transaction for the user account at the first entity satisfies the one or more threshold criteria that i) are for the subset of products or services for which the first entity provides transactions, ii) were received from the second system for the second entity that provides the products or services, and iii) if satisfied would cause the transaction management system to access second data for the second entity that is stored in a database in the transaction management system to complete a transaction;
in response to determining that the transaction for the user account at the first entity does not satisfy the one or more threshold criteria for the second entity:
determining to skip accessing second data for the second entity to complete the transaction; and
accessing first data for the first entity stored in a first database in the transaction management system to complete the transaction; and
accessing account data for the user account stored in an account database in the transaction management system to complete the transaction;
retrieving, from a first external system and using a network and the account data, user transaction data; and
completing the transaction by providing, to another system for the first entity and using the first data, the user transaction data and the product or service provider data.

18. The computer storage media of claim 17, the operations comprising, in response to determining that the transaction for the user account at the first entity does not satisfy the one or more threshold criteria for the second entity, determining to skip retrieving, from a second external system and using the network and the second data for the second entity that provides the product or service, product or service provider data to complete the transaction.

19. The computer storage media of claim 17, wherein determining the data for the transaction comprises receiving, from a first system for the first entity and using the network, the data for the transaction a) for the user account, b) at the first entity that performs transactions for the plurality of products, services, or a combination of both, from the plurality of second entities and c) for the product or service provided by the second entity from the plurality of second entities.

20. The computer storage media of claim 19, wherein determining the data for the transaction comprises receiving, from a device for the user account and using the network, the data for the transaction a) for the user account, b) at the first entity that performs transactions for the plurality of products, services, or a combination of both, from the plurality of second entities and c) for the product or service provided by the second entity from the plurality of second entities.

\* \* \* \* \*